March 29, 1960

E. HEMIG 2,930,831

STORAGE BATTERY CAP

Filed Sept. 17, 1954

ERNST HEMIG
INVENTOR.

BY Fulwider, Mattingly
and Huntley
ATTORNEYS.

United States Patent Office 2,930,831
Patented Mar. 29, 1960

2,930,831

STORAGE BATTERY CAP

Ernst Hemig, Zurich, Switzerland, assignor to Thomas C. Rogers, Sunland, Calif.

Application September 17, 1954, Serial No. 456,733

3 Claims. (Cl. 136—177)

The present invention relates generally to a device for the filling of containers, especially electrical storage batteries, with liquids up to a designated level.

When liquid is added to the conventional electric storage batteries, for example automobile batteries, the acid electrolyte often overflows. This has the main disadvantage that the overflowing acid tends to corrode metal parts.

As a preventative measure certain filling caps are used to facilitate the filling of such containers to a designated level. These caps contain at least one air-exhaust passage as well as at least one liquid-intake passage. When the cap is in position, the mouth of the liquid-intake passage lies at a higher level in the container than the intake end of the air-exhaust passage. As the fluid level in the container rises, the air-exhaust passage will eventually be cut off and the flow of the liquid into the container through the liquid-intake passage will stop.

In practice, it appears that certain difficulties are encountered with the commonly used caps of this type in filling as well as in charging storage batteries equipped therewith. The overflowing of a battery equipped with such a cap cannot be prevented if the liquid is added at a fast rate. Furthermore, there is always the possibility that gases saturated with the electrolyte formed in the charging process will rise through the intake passage and have a corrosive effect outside of the battery. With such caps the overflowing of the battery cannot be prevented if the liquid is applied to the plug under pressure, as for example with a pipette. This is due to the fact that the air can escape from the battery through some other intake passages that are not under such pressure.

It is a major object of the present invention to provide a new and improved storage battery cap adapted to overcome the above-mentioned disadvantages of conventional storage battery caps. The cap of the present invention is designed to facilitate the filling of electrical storage batteries up to a designated level. This cap contains an air-exhaust passage as well as liquid-intake passages for the liquid. The mouth of the liquid-intake passages are located above the intake end of the air-exhaust passage. The cap is distinguished by a surface located above the liquid-intake passage in the intake or reservoir chamber which at least partially overhangs the liquid-intake passages. The purpose of this surface is to break up the incoming stream of liquid and apply it in a uniform manner to all of the intake passages thereby preventing any escape of air from the battery through the intake passages.

Another object is to provide a storage battery cap of the aforedescribed nature having a water reservoir which automatically meters a reserve supply of water to the battery.

An additional object is to provide a storage battery cap of the aforedescribed nature which permits immediate visual inspection of the water level of the storage battery.

Another object is to provide a storage battery cap of the aforedescribed nature having a unique cover which may be readily removed in order to add water.

A further object is to provide a storage battery cap of the aforedescribed nature which is of substantially the same size as a conventional storage battery cap.

These and other objects and advantages of the present invention will become apparent from the following detailed description of a preferred embodiment and an alternate form therefor, when taken in conjunction with the appended drawings wherein.

Figure 1:
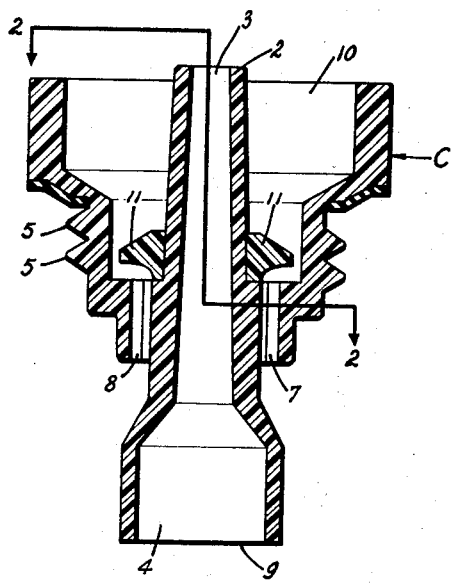
Figure 1 is a central vertical cross-sectional view of a preferred form of storage battery cap embodying the present invention.

Referring to the drawings, C designates a battery cap fabricated of plastic, hard rubber or a similar suitable material. This battery cap C includes a central air-exhaust passage 3 formed by a vertical tube 2. This passage 3 is widened at its lower end so as to define a mouth 4 that is disposed in the storage battery when the cap is screwed into the cover thereof by means of threads 5. The cap C is formed with a plurality, as for example four, liquid-intake passages 7 which are arranged concentrically around the air-exhaust passage 3. The liquid-intake passages 7 are shown as being segments of circles with their mouths 8 located within the storage battery (not shown) at a higher elevation than the mouth 9 of the air-exhaust passage 3. The liquid-intake passages 7 terminate at their upper ends within an intake liquid reservoir 10 that is formed within the upper portion of the cap C. This intake liquid reservoir 10 is widened at its upper portion and is utilized for the storage of the electrolyte or other liquid to be added to the storage battery. The reservoir 10 is formed with a small radial extension 11 extending around the outside of the tube 2 above the upper end of the intake passages 7 so as to overhang the upper end thereof. The purpose of this extension 11 is to break up the incoming liquid stream and to apply the liquid uniformly to all four intake passages thereby preventing any escape of air from the storage battery through these passages 7. At the same time the escape of electrolyte vapors resulting from the charging of the batteries will be prevented inasmuch as these rising vapors will condense on the lower surface (facing the upper end of the intake passage 7) of the extension 11. In the embodiment disclosed herein the extension 11 has the shape of a circular flange that is fitted over the air-exhaust tube 2 and is secured thereto in a suitable manner. The extension 11 is preferably fabricated of the same material as the cap C. It could, however, be formed integrally with the cap or the air-exhaust tube 2.

When liquid is introduced into the reservoir 10 it will distribute itself over the radial extension 11 so as to be applied uniformly to the four intake passages 7 and flow into the storage battery. The air contained within the storage battery will flow upwardly out through the relatively wide air-exhaust passage 3. The filling process continues until the liquid within the storage battery reaches a level determined by the elevation of the mouth 9 of the air-exhaust tube 2. When the rising level of the electrolyte within the storage battery closes off the mouth 9 of the air-exhaust passage 3 the flow of liquid from the reservoir 10 will terminate. By unscrewing the cap C relative to the cover of the storage battery, the liquid which is present in the reservoir 10 may be drained through the intake passages 7 into the battery so that it may be completely filled.

Figure 3:
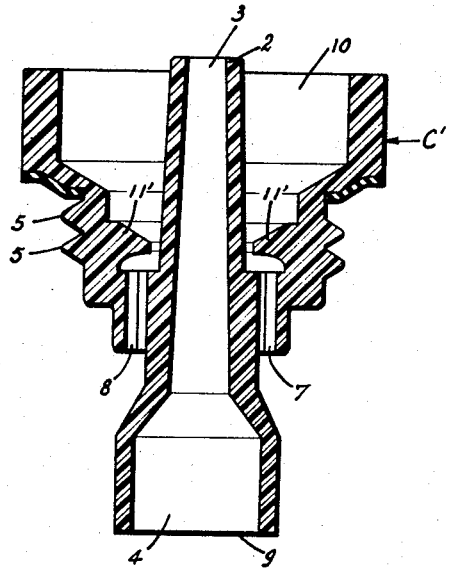
Figure 3 is a central vertical sectional view showing an alternate form of storage battery cap embodying the present invention.
Figure 2:
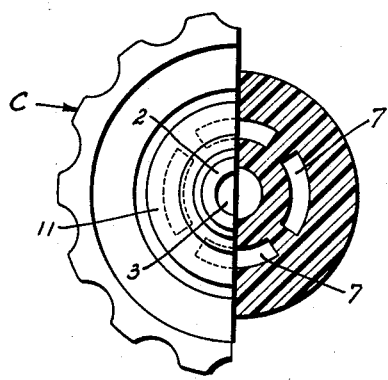
Figure 2 is a horizontal sectional view taken along lines 2—2 of Figure 1.

Referring now to Figure 3, there is shown an alternate form of storage battery cap C' embodying the present invention. This form is similar to that shown in Figures 1 and 2 except that the extension 11' extends radially inwardly from the inner wall of the reservoir 10. The extension 11' is spaced above and overhangs the upper ends of the liquid-intake passages 7. It functions in the same manner as the extension 11 shown in Figures 1 and 2.

Figure 4:
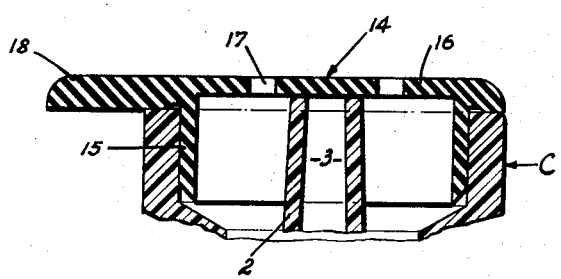
Figure 4 is a fragmentary central vertical sectional view showing a cover which may be utilized with either form of said battery cap.

Referring now to Figure 4, a cover 14 may be provided for the upper end of either of the aforedescribed caps C and C'. This cover 14 may be formed of a suitable synthetic rubber or plastic and includes an annular flange 15 that is telescopically removably insertable within the upper portion of the reservoir 10, an integral horizontal closure element 16 extending across the upper end of the flange 15, and a lifting tab 18 extending radially outwardly from one side of the closure element 16. Preferably, one or more apertures 17 will be formed through the closure element 16 to permit the escape of gases rising through the air-exhaust passage 3. The cover 14 may be readily lifted away from the cap by means of the tab 17 in order to add liquid to the reservoir 10.

While there has been shown and described hereinbefore what is presently considered to be the preferred embodiments of the present invention, it will be apparent that various changes and modifications may be made thereto without departing from the spirit of the invention or the scope of the following claims.

I claim:
1. A storage battery cap, comprising: a body formed with a reservoir having liquid-intake passages extending downwardly from the lower end of said reservoir, said passages being concentrically arranged relative to said body and of arcuate shape; a horizontal extension spaced above and at least partially overhanging the upper end of said liquid-intake passages; an air-exhaust passage defined by a vertical tube which coaxially extends through said body, the lower end of said air-exhaust passage being disposed below the lower end of said liquid intake passages; and a cover for the upper end of said body, said cover including a horizontal closure which seals the upper end of said air-exhaust passage and aperture means providing communication between said reservoir and the atmosphere.

2. A storage battery cap as set forth in claim 1 where said extension is defined by a ring which is telescopically disposed upon said tube.

3. A storage battery cap as set forth in claim 1 where said extension is defined by an integral annular flange that extends radially inwardly from the inner wall of said reservoir.

References Cited in the file of this patent

UNITED STATES PATENTS

| 2,469,560 | Jutte | May 10, 1949 |
|---|---|---|
| 2,682,568 | Stofen | June 28, 1954 |

FOREIGN PATENTS

| 125,286 | Australia | Sept. 11, 1947 |
|---|---|---|
| 377,471 | Italy | Dec. 18, 1939 |